US012566444B1

(12) United States Patent
Sharma et al.

(10) Patent No.: US 12,566,444 B1
(45) Date of Patent: Mar. 3, 2026

(54) METHOD AND A SYSTEM FOR POSITIONING AUTONOMOUS MOBILE VEHICLES IN AN OPERATING ENVIRONMENT

(71) Applicant: Rapyuta Robotics Co., Ltd., Tokyo (JP)

(72) Inventors: Abhishek Sharma, Tokyo (JP); Christian Helm, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 326 days.

(21) Appl. No.: 18/160,319

(22) Filed: Jan. 27, 2023

(51) Int. Cl.
　　*G05D 1/02*　　　(2020.01)
　　*G05D 1/00*　　　(2006.01)

(52) U.S. Cl.
　　CPC .................................. *G05D 1/0289* (2013.01)

(58) Field of Classification Search
　　CPC ................................ G05D 1/2089; G05D 1/02
　　USPC .......................................................... 701/23
　　See application file for complete search history.

(56) References Cited

U.S. PATENT DOCUMENTS

| | | | | |
|---|---|---|---|---|
| 6,049,745 A * | 4/2000 | Douglas | ............... | G05D 1/0261 318/587 |
| 9,098,084 B2 * | 8/2015 | Kumazawa | .......... | G05B 19/416 |

| | | | | |
|---|---|---|---|---|
| 12,106,586 B2 * | 10/2024 | Grace | .................. | G06V 10/803 |
| 12,203,760 B2 * | 1/2025 | Choi | .................. | G01C 21/3484 |
| 12,223,835 B1 * | 2/2025 | Plascencia-Vega | .......................... | B60W 30/0956 |
| 12,259,737 B2 * | 3/2025 | Donderici | .............. | B65G 67/04 |
| 2023/0234779 A1 * | 7/2023 | Korge-HåRajuvet | .. | B65G 1/065 414/279 |

* cited by examiner

*Primary Examiner* — Andrew Joseph Rudy
(74) *Attorney, Agent, or Firm* — Trupti P. Joshi

(57) ABSTRACT

The present disclosure relates to method of positioning autonomous mobile vehicles in operating environment. The method comprises transmitting positioning request indicating current position and first target position of autonomous mobile vehicle to other autonomous mobile vehicles; identifying one or more autonomous mobile vehicles in vicinity of first target position, based on location information received from one or more autonomous mobile vehicles; determining first destination position for autonomous mobile vehicle and one or more autonomous mobile vehicles, based on obstacle information of operating environment, one or more pre-defined constraints, and pre-defined cost function; receiving one or more second destination positions for autonomous mobile vehicle and one or more autonomous mobile vehicles, from one or more autonomous mobile vehicles; and identifying optimal destination position for autonomous mobile vehicle and one or more autonomous mobile vehicles, from first destination position and one or more second destination positions, based on pre-defined cost function.

20 Claims, 7 Drawing Sheets

400

TRANSMIT POSITIONING REQUEST INDICATING CURRENT POSITION AND FIRST TARGET POSITION OF AUTONOMOUS MOBILE VEHICLE TO OTHER AUTONOMOUS MOBILE VEHICLES FROM PLURALITY OF AUTONOMOUS MOBILE VEHICLES — 401

IDENTIFY ONE OR MORE AUTONOMOUS MOBILE VEHICLES IN VICINITY OF FIRST TARGET POSITION, BASED ON LOCATION INFORMATION RECEIVED FROM ONE OR MORE AUTONOMOUS MOBILE VEHICLES IN RESPONSE TO POSITIONING REQUEST — 402

DETERMINE FIRST DESTINATION POSITION FOR ASSOCIATED AUTONOMOUS MOBILE VEHICLE AND EACH OF ONE OR MORE AUTONOMOUS MOBILE VEHICLES, BASED ON OBSTACLE INFORMATION OF OPERATING ENVIRONMENT, ONE OR MORE PRE-DEFINED CONSTRAINTS, AND PRE-DEFINED COST FUNCTION — 403

RECEIVE ONE OR MORE SECOND DESTINATION POSITIONS FOR ASSOCIATED AUTONOMOUS MOBILE VEHICLE AND FOR EACH OF ONE OR MORE AUTONOMOUS MOBILE VEHICLES, FROM ONE OR MORE AUTONOMOUS MOBILE VEHICLES — 404

IDENTIFY OPTIMAL DESTINATION POSITION, FOR ASSOCIATED AUTONOMOUS MOBILE VEHICLE AND EACH OF ONE OR MORE AUTONOMOUS MOBILE VEHICLES, FROM CORRESPONDING FIRST DESTINATION POSITION AND ONE OR MORE SECOND DESTINATION POSITIONS, BASED ON PRE-DEFINED COST FUNCTION — 405

100

302

303

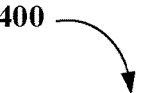

TRANSMIT POSITIONING REQUEST INDICATING CURRENT POSITION AND FIRST TARGET POSITION OF AUTONOMOUS MOBILE VEHICLE TO OTHER AUTONOMOUS MOBILE VEHICLES FROM PLURALITY OF AUTONOMOUS MOBILE VEHICLES

401

IDENTIFY ONE OR MORE AUTONOMOUS MOBILE VEHICLES IN VICINITY OF FIRST TARGET POSITION, BASED ON LOCATION INFORMATION RECEIVED FROM ONE OR MORE AUTONOMOUS MOBILE VEHICLES IN RESPONSE TO POSITIONING REQUEST

402

DETERMINE FIRST DESTINATION POSITION FOR ASSOCIATED AUTONOMOUS MOBILE VEHICLE AND EACH OF ONE OR MORE AUTONOMOUS MOBILE VEHICLES, BASED ON OBSTACLE INFORMATION OF OPERATING ENVIRONMENT, ONE OR MORE PRE-DEFINED CONSTRAINTS, AND PRE-DEFINED COST FUNCTION

403

RECEIVE ONE OR MORE SECOND DESTINATION POSITIONS FOR ASSOCIATED AUTONOMOUS MOBILE VEHICLE AND FOR EACH OF ONE OR MORE AUTONOMOUS MOBILE VEHICLES, FROM ONE OR MORE AUTONOMOUS MOBILE VEHICLES

404

IDENTIFY OPTIMAL DESTINATION POSITION, FOR ASSOCIATED AUTONOMOUS MOBILE VEHICLE AND EACH OF ONE OR MORE AUTONOMOUS MOBILE VEHICLES, FROM CORRESPONDING FIRST DESTINATION POSITION AND ONE OR MORE SECOND DESTINATION POSITIONS, BASED ON PRE-DEFINED COST FUNCTION

METHOD AND A SYSTEM FOR POSITIONING AUTONOMOUS MOBILE VEHICLES IN AN OPERATING ENVIRONMENT

TECHNICAL FIELD

The present disclosure generally relates to the field of autonomous mobile vehicles. More particularly, the present disclosure relates to a method and a system for positioning autonomous mobile vehicles in an operating environment.

BACKGROUND

Autonomous mobile vehicles are used in a wide range of applications to perform multiple tasks. For example, the autonomous mobile vehicles are deployed as guided vehicles, automated storage and retrieval systems, robotic arms, and the like, in an operating environment. The autonomous mobile vehicles navigate and move around spaces independently when performing the tasks.

The operating environment may include a large number of autonomous vehicles. Each of the autonomous vehicles may be associated with multiple pick/drop positions for performing the tasks. In such case, there may be congestion at the pick/drop positions when multiple autonomous mobile vehicles are associated with same or nearby pick/drop positions. Further, the autonomous mobile vehicles may collide with each other when completing the tasks. For example, there may be a narrow passage between two shelves in the operating environment which may lead to collision of the autonomous mobile vehicles. Further, the autonomous mobile vehicles cannot move past each other in the narrow passage. In another example, an autonomous mobile vehicle may block a path for a human picker or other autonomous mobile vehicle.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of positioning autonomous mobile vehicles in an operating environment. The method comprises transmitting a positioning request indicating a current position and a first target position from a plurality of target positions of the autonomous mobile vehicle, to other autonomous mobile vehicles from the plurality of autonomous mobile vehicles. Further, the method comprises identifying one or more autonomous mobile vehicles of the plurality of autonomous mobile vehicles in vicinity of the first target position, based on location information received from the one or more autonomous mobile vehicles in response to the positioning request. Furthermore, the method comprises determining a first destination position for the associated autonomous mobile vehicle and each of the one or more autonomous mobile vehicles, based on obstacle information of the operating environment, one or more pre-defined constraints, and a pre-defined cost function. Further, the method comprises receiving one or more second destination positions for the associated autonomous mobile vehicle and for each of the one or more autonomous mobile vehicles, from one or more autonomous mobile vehicles. Thereafter, the method comprises identifying an optimal destination position, for the associated autonomous mobile vehicle and each of the one or more autonomous mobile vehicles, from the corresponding first destination position and the one or more second destination positions, based on the pre-defined cost function.

In an embodiment, the present disclosure discloses a computing engine for positioning autonomous mobile vehicles in an operating environment. The computing engine comprises one or more processors and a memory. The one or more processors are configured to transmit a positioning request indicating a current position and a first target position from a plurality of target positions of the autonomous mobile vehicle, to other autonomous mobile vehicles from the plurality of autonomous mobile vehicles. Further, the one or more processors are configured to identify one or more autonomous mobile vehicles of the plurality of autonomous mobile vehicles in vicinity of the first target position, based on location information received from the one or more autonomous mobile vehicles in response to the positioning request. Furthermore, the one or more processors are configured to determine a first destination position for the associated autonomous mobile vehicle and each of the one or more autonomous mobile vehicles, based on obstacle information of the operating environment, one or more pre-defined constraints, and a pre-defined cost function. Further, the one or more processors are configured to receive one or more second destination positions for the associated autonomous mobile vehicle and for each of the one or more autonomous mobile vehicles, from one or more autonomous mobile vehicles. Thereafter, the one or more processors are configured to identify an optimal destination position, for the associated autonomous mobile vehicle and each of the one or more autonomous mobile vehicles, from the corresponding first destination position and the one or more second destination positions, based on the pre-defined cost function.

In an embodiment, the present disclosure discloses a non-transitory computer readable medium including instructions stored thereon that when processed by one or more processors cause a computing engine to position autonomous mobile vehicles in an operating environment. The one or more processors are configured to transmit a positioning request indicating a current position and a first target position from a plurality of target positions of the autonomous mobile vehicle, to other autonomous mobile vehicles from the plurality of autonomous mobile vehicles. Further, the one or more processors are configured to identify one or more autonomous mobile vehicles of the plurality of autonomous mobile vehicles in vicinity of the first target position, based on location information received from the one or more autonomous mobile vehicles in response to the positioning request. Furthermore, the one or more processors are configured to determine a first destination position for the associated autonomous mobile vehicle and each of the one or more autonomous mobile vehicles, based on obstacle information of the operating environment, one or more pre-defined constraints, and a pre-defined cost function. Further, the one or more processors are configured to receive one or more second destination positions for the associated autonomous mobile vehicle and for each of the one or more autonomous mobile vehicles, from one or more autonomous mobile vehicles. Thereafter, the one or more processors are configured to identify an optimal destination position, for the associated autonomous mobile vehicle and each of the one or more autonomous mobile vehicles, from the corresponding first destination position and the one or more second destination positions, based on the pre-defined cost function.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 4 shows an exemplary flow chart illustrating method steps for positioning the autonomous mobile vehicles in the operating environment, in accordance with some embodiments of the present disclosure;

Figure 1:
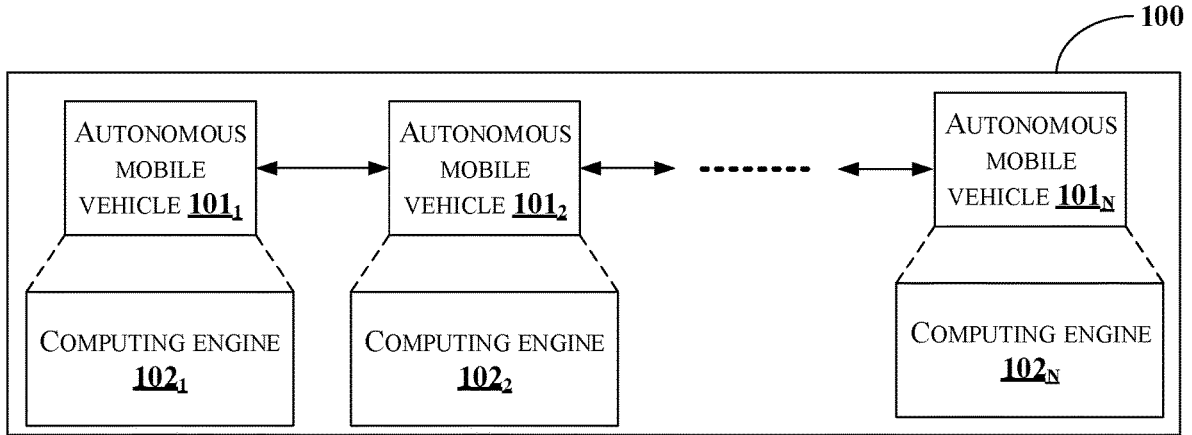
FIG. 1 illustrates an exemplary environment of positioning autonomous mobile vehicles in an operating environment, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Autonomous mobile vehicles are deployed as guided vehicles, automated storage and retrieval systems, robotic arms, and the like, in an operating environment. The autonomous mobile vehicles navigate and move around spaces independently when performing the tasks. The operating environment may include a large number of autonomous vehicles. Each of the autonomous vehicles may be associated with multiple pick/drop positions for performing the tasks. In such case, there may be congestion at the pick/drop positions when multiple autonomous mobile vehicles are associated with same or nearby pick/drop positions. Further, the autonomous mobile vehicles may collide with each other when completing the tasks.

Accordingly, the present disclosure provides a method of positioning autonomous mobile vehicles in an operating environment. In the present disclosure, an autonomous mobile vehicle informs a current position and a target position of the autonomous mobile vehicle to other autonomous mobile vehicles. Then, all the autonomous mobile vehicles communicate location information with each other, to identify one or more autonomous mobile vehicles in vicinity of the target position. Then, the autonomous mobile vehicle and the one or more autonomous mobile vehicles determine respective destination position and destination positions for other autonomous mobile vehicles, considering obstacle information of the operating environment, pre-defined constraints, and a pre-defined cost function. This ensures that there is no congestion at the target position. Further, this avoids collision of the autonomous mobile vehicle with obstacles in the operating environment and the other autonomous mobile vehicles. Further, the autonomous mobile vehicle identifies respective optimal destination position and optimal destination positions for the one or more autonomous mobile vehicles, based on the pre-defined cost function. Hence, the present disclosure ensures optimal positioning of the autonomous mobile vehicles in the operating environment.

FIG. 1 illustrates an exemplary environment for positioning autonomous mobile vehicles in an operating environment, in accordance with some embodiments of the present disclosure. The exemplary environment 100 comprises an autonomous mobile vehicle $101_1$, an autonomous mobile vehicle $101_2$, . . . , and an autonomous mobile vehicle $101_N$ (collectively referred as a plurality of autonomous mobile vehicles 101 hereafter in the present description). The plurality of autonomous mobile vehicles 101 may include, but not limited to, a robot, a guided vehicle, a robotic arm, a forklift, and the like. The plurality of autonomous mobile vehicles 101 are configured to perform tasks in the operating environment. The tasks may include, for example, picking and dropping an item in a storage unit, placing the item in the storage unit, and the like. The operating environment may include for example, a warehouse, a supermarket, a department store, a hypermarket, and the like. In an example, an autonomous mobile vehicle may be implemented as fully automated vehicle. In another example, the autonomous mobile vehicle may be partially assisted by an operator in the operating environment. Each of the plurality of autonomous mobile vehicles $101_1$, $101_2$, . . . , $101_N$ are associated with a respective computing engine $102_1$, a computing engine $102_2$, . . . , and a computing engine $102_N$, respectively (collectively referred as a computing engine 102 in the present description).

In an embodiment, consider an autonomous mobile vehicle of the plurality of autonomous mobile vehicles 101. The autonomous mobile vehicle may be associated with a plurality of target positions. The plurality of target positions may include for example, pick/drop positions of the autonomous mobile vehicle. The autonomous mobile vehicle may be associated with a first task at a first target position from the plurality of target positions. The computing engine 102 associated with the autonomous mobile vehicle may transmit a positioning request to other autonomous mobile vehicles from the plurality of autonomous mobile vehicles 101. The computing engine 102 may transmit the positioning request to identify autonomous mobile vehicles in vicinity of the first target position, so as to determine optimal positioning of the autonomous mobile vehicles at the first target position or in the vicinity of the first target position. The positioning request may indicate a current position and the first target position from the plurality of target positions of the autonomous mobile vehicle. The positioning request provides an indication to the other autonomous mobile vehicles that the autonomous mobile vehicle is located at the current position and is intended to arrive at the first target position. One or more autonomous mobile vehicles of the plurality of autonomous mobile vehicles 101 may be in the vicinity of the first target position, when the positioning request is received. Each of the one or more autonomous mobile vehicles may inform it's presence in the vicinity of the first target position by transmitting respective location information.

Each of the computing engines associated with the autonomous mobile vehicle and the one or more autonomous mobile vehicles may determine a respective destination position and destination positions for other autonomous mobile vehicles, based on obstacle information of the operating environment, one or more pre-defined constraints, and a pre-defined cost function. This is performed to avoid congestion at the first target position and collision of the autonomous mobile vehicle and the one or more autonomous mobile vehicles. Finally, the computing engine 102 associated with the autonomous mobile vehicle may identify respective optimal destination position and optimal destination positions for each of the one or more autonomous mobile vehicles, from multiple destination positions (the respective destination position and the destination positions) that minimizes the pre-defined cost function.

Figure 2:
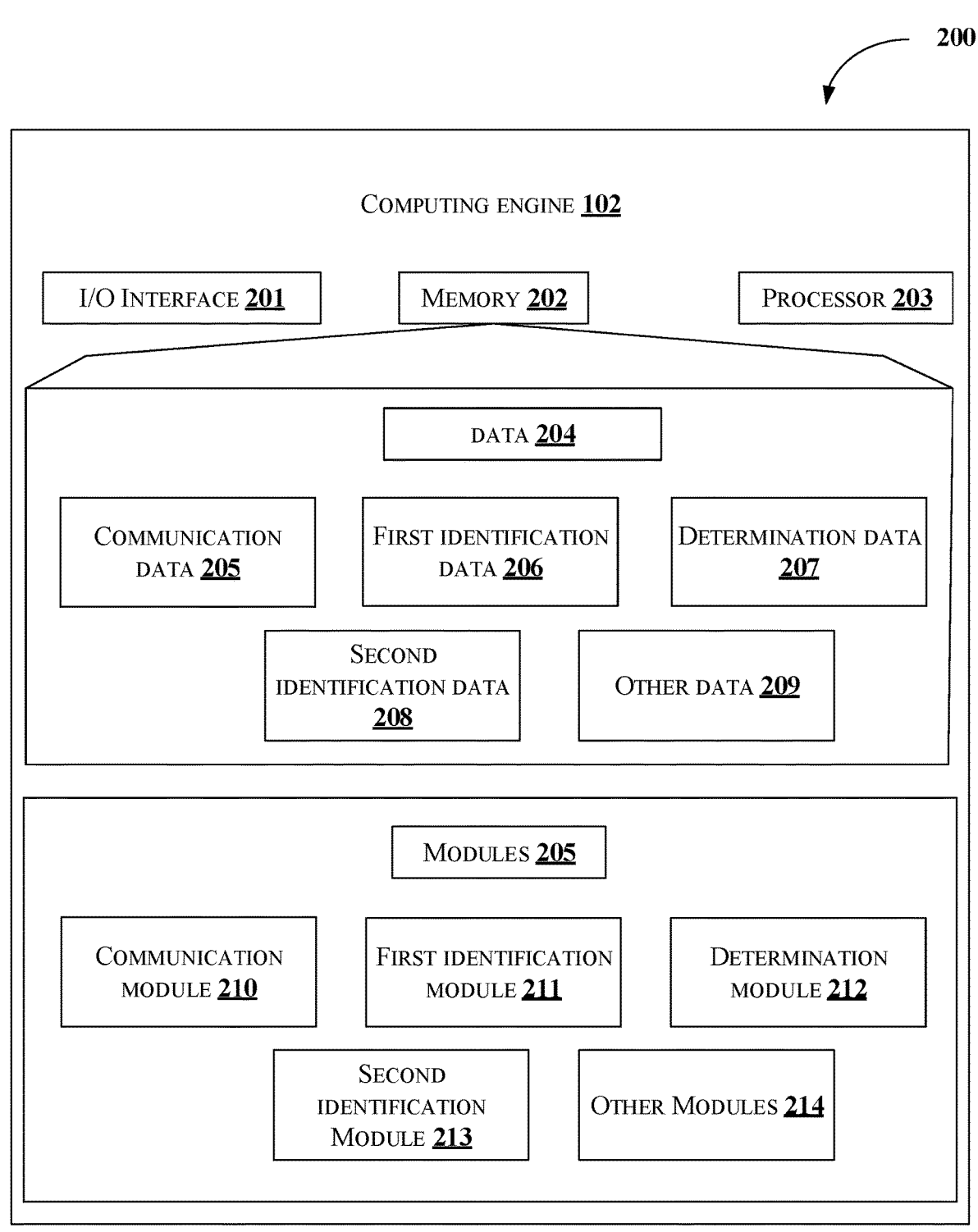
FIG. 2 illustrates a detailed diagram of a computing engine for positioning the autonomous mobile vehicles in the operating environment, in accordance with some embodiments of the present disclosure.

FIG. 2 illustrates a detailed diagram 200 of the computing engine 102 for positioning the autonomous mobile vehicles in the operating environment, in accordance with some embodiments of the present disclosure. The computing engine 102 may include an I/O interface 201, a memory 202, and Central Processing Units 203 (also referred as "CPUs" or "one or more processors 203"). In some embodiments, the memory 202 may be communicatively coupled to the one or more processors 203. The memory 202 stores instructions executable by the one or more processors 203. The one or more processors 203 may comprise at least one data processor for executing program components for executing user or system-generated requests. The memory 202 may be communicatively coupled to the one or more processors 203. The memory 202 stores instructions, executable by the one or more processors 203, which, on execution, may cause the one or more processors 203 to position the plurality of autonomous mobile vehicles 101 in the operating environment. The I/O interface 201 is coupled with the one or more processors 203 through which an input signal or/and an output signal is communicated. For example, the one or more processors 203 may communicate with other autonomous mobile vehicles from the plurality of autonomous mobile vehicles 101 via the I/O interface 201.

In an embodiment, the memory 202 may include one or more modules 205 and data 204. The one or more modules 205 may be configured to perform the steps of the present disclosure using the data 204, to position the plurality of autonomous mobile vehicles 101 in the operating environment. In an embodiment, each of the one or more modules 205 may be a hardware unit which may be outside the memory 202 and coupled with the computing engine 102. As used herein, the term modules 205 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 205 when configured with the described functionality defined in the present disclosure will result in a novel hardware.

In one implementation, the modules 205 may include, for example, a communication module 210, a first identification module 211, a determination module 212, a second identification module 213, and other modules 214. It will be appreciated that such aforementioned modules 205 may be represented as a single module or a combination of different modules. In one implementation, the data 204 may include, for example, communication data 205, first identification data 206, determination data 207, second identification data 208, and other data 209.

In an embodiment, the communication module 210 may be configured to transmit a positioning request to other autonomous mobile vehicles from the plurality of autonomous mobile vehicles 101. The autonomous mobile vehicle may be associated with a plurality of target positions. The plurality of target positions may include for example, pick/drop positions of the autonomous mobile vehicle. For example, the plurality of target positions may include pick 1, pick 2, and drop 1. The pick 1 may be a location/point for picking of item 1 from shelf 1, the pick 2 may be a location/point for picking of item 2 from shelf 2, the drop 1 may be a location/point for dropping of the item 1 at shelf 5 in the operating environment. In an embodiment, the communication module 210 may receive the plurality of target positions of the autonomous mobile vehicle from a user, a database, a system configured to provide the tasks to the autonomous mobile vehicle, and the like. The communication module 210 may transmit the positioning request indicating the current position and the first target position from the plurality of target positions to the other autonomous mobile vehicles. In an embodiment, the communication module 210 may receive location information from the one or more autonomous mobile vehicles in response to the positioning request. In an example, the autonomous mobile vehicle may include a robot in a retail store. The current position of the autonomous mobile vehicle may include a location in clothing section of the retail store. The first target position may include a location in food section of the retail store. In an example, the communication module 210 may transmit the positioning request to ten robots deployed in the retail store.

In an embodiment, the communication module 210 may be configured to receive one or more second destination positions for the associated autonomous mobile vehicle and for each of the one or more autonomous mobile vehicles, from the one or more autonomous mobile vehicles. The computing engines associated with the one or more autonomous mobile vehicles may determine the one or more second destination positions for the associated autonomous mobile vehicle and for each of the one or more autonomous mobile vehicles. The computing engines may determine the one or more second destination positions based on the obstacle information, the one or more pre-defined constraints, and the pre-defined cost function. The one or more pre-defined constraints may comprise, but not limited to, a minimum distance of the associated mobile object and the one or more autonomous mobile vehicles with each other, an orientation of the associated autonomous mobile vehicle and the one or more autonomous mobile vehicles with respect to each other and storage units in the operating environment, and the determination of the one or more second destination positions of the associated autonomous mobile vehicle and each of the one or more autonomous mobile vehicles prior to notifying the first target position and a target position from respective target positions to operators in the operating environment, respectively. The pre-defined cost function may comprise, but not limited to, a function indicating the optimal destination position of each of the plurality of autonomous mobile vehicles 101 with respect to storage units in the operating environment, a function indicating a free passage between the storage units, a minimum disparity between the one or more second destination positions of each of the one or more autonomous mobile vehicles and the target position from respective target positions, a minimum disparity between the one or more second destination positions of the associated autonomous mobile vehicle with the first target position. The communication module 210 may receive the one or more second destination positions for the associated autonomous mobile vehicle and for each of the one or more autonomous mobile vehicles from the computing engines. The current position, the target position, the location information, and the one or more second destination positions may be stored as the communication data 206 in the memory 202.

In an embodiment, the first identification module 213 may be configured to receive the communication data 206 including the location information from the communication module 210. The location information may comprise co-ordinates of current location of the one or more autonomous mobile vehicles. The one or more autonomous mobile vehicles may compare corresponding current location with the first target position. Further, the one or more autonomous mobile vehicles in vicinity of the first target position may transmit the location information to the first identification module 213. The first identification module 213 may identify the one or more autonomous mobile vehicles of the plurality of autonomous mobile vehicles 101 in vicinity of the first target position, based on the location information received from the one or more autonomous mobile vehicles. Referring to the above-stated example, three robots from the ten robots may be located in the food section of the retail store. The first identification module 213 may identify that the three robots are located in the vicinity of the first target position. Data related to the one or more autonomous mobile vehicles may be stored as the first identification data 207 in the memory 202. In an example, the data related to the one or more autonomous mobile vehicles may comprise an identification number and the location information of corresponding one or more autonomous vehicles.

In an embodiment, the determination module 214 may be configured to receive the first identification data 207 from the first identification module 213. The determination module 214 may be configured to determine a first destination position for the associated autonomous mobile vehicle and each of the one or more autonomous mobile vehicles. The determination module 214 determines the first destination position for the associated autonomous mobile vehicle and each of the one or more autonomous mobile vehicles to ensure that there is no collision or congestion at the first target position or in the vicinity of the first target position. The determination module 214 may be configured to determine the first destination position based on obstacle information of the operating environment, one or more pre-defined constraints, and a pre-defined cost function. The obstacle information may include information of the obstacles in the operating environment. The obstacles may include storage units, operators, reception units, and the like. In an embodiment, the determination module 214 may obtain the obstacle information based on a convex polygon map. A person skilled in the art will appreciate that methods other than the above-mentioned method may be used to obtain the obstacle information.

Figure 3A:
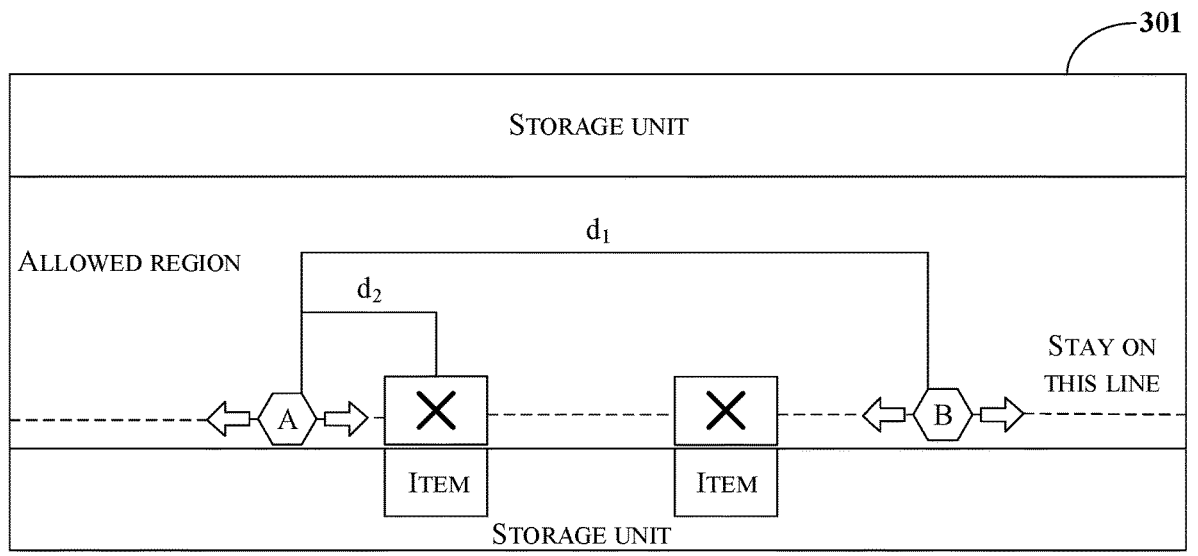
FIGS. 3A-3D show exemplary illustrations for positioning the autonomous mobile vehicles in the operating environment, in accordance with some embodiments of the present disclosure.
Figure 3B:
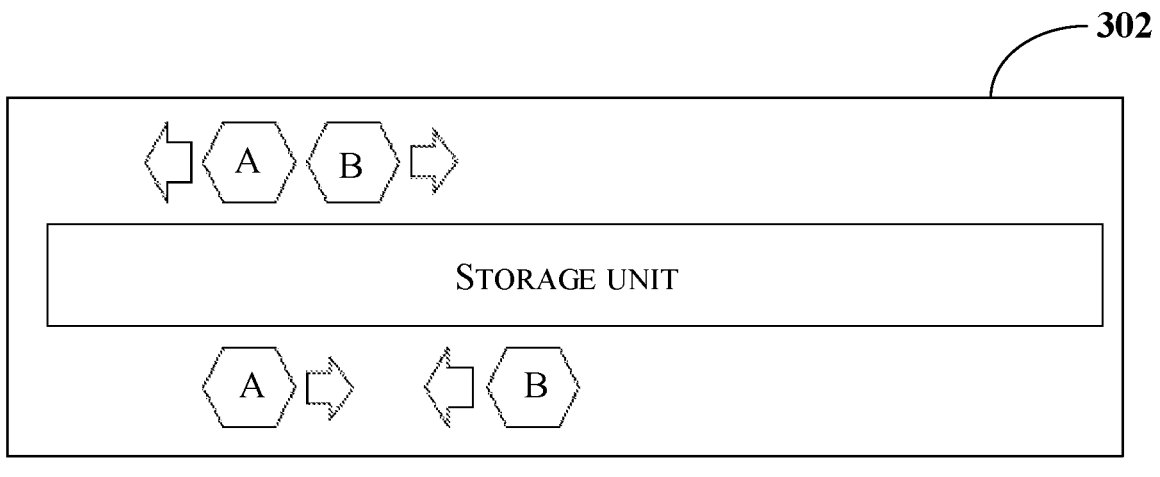

In an embodiment, the one or more pre-defined constraints may comprise, but not limited to, a minimum distance of the associated mobile object and the one or more autonomous mobile vehicles with each other, an orientation of the associated autonomous mobile vehicle and the one or more autonomous mobile vehicles with respect to each other and storage units in the operating environment, and the determination of the first destination position of the associated autonomous mobile vehicle and each of the one or more autonomous mobile vehicles prior to notifying the first target position and a target position from respective target positions to operators in the operating environment, respectively. The one or more pre-defined constraints include constraints to be considered by the determination module 214. FIG. 3A shows an exemplary illustration of the one or more pre-defined constraints. Consider the operation environment as the retail store which includes storage units as illustrated in FIG. 3A. The storage units include items. Robot 'A' and Robot 'B' are two autonomous mobile vehicles in the food section of the retail store. The robot 'A' and the robot 'B' are positioned such that a distance 'd₁' between them is greater than the minimum distance. The minimum distance may be 1 m. FIG. 3B shows an exemplary illustration of the orientation of the one or more autonomous mobile vehicles with respect to each other. In an example, the one or more autonomous vehicles may be oriented opposite each other, such that screens of the one or more autonomous vehicles may be opposite to each other. In another example, there may be a minimum distance between the one or more autonomous vehicles when the one or more autonomous vehicles face each other, such that trays of the one or more autonomous vehicles may be opened and are accessible to the operators. In another example, the one or more autonomous vehicles may include a +90 or −90 degree orientation with respect to the storage units, such that the operators can easily access the storage units. Reference is made again to FIG. 2. Generally, the operators may be moving in the operating environment to perform certain tasks, assist the plurality of autonomous mobile vehicles 101, and the like. Hence, determination of the first destination position may be performed prior to notifying the operators in the operating environment such that the operators are aware of the first destination position of the associated autonomous mobile vehicle and each of the one or more autonomous mobile vehicles.

Figure 3C:
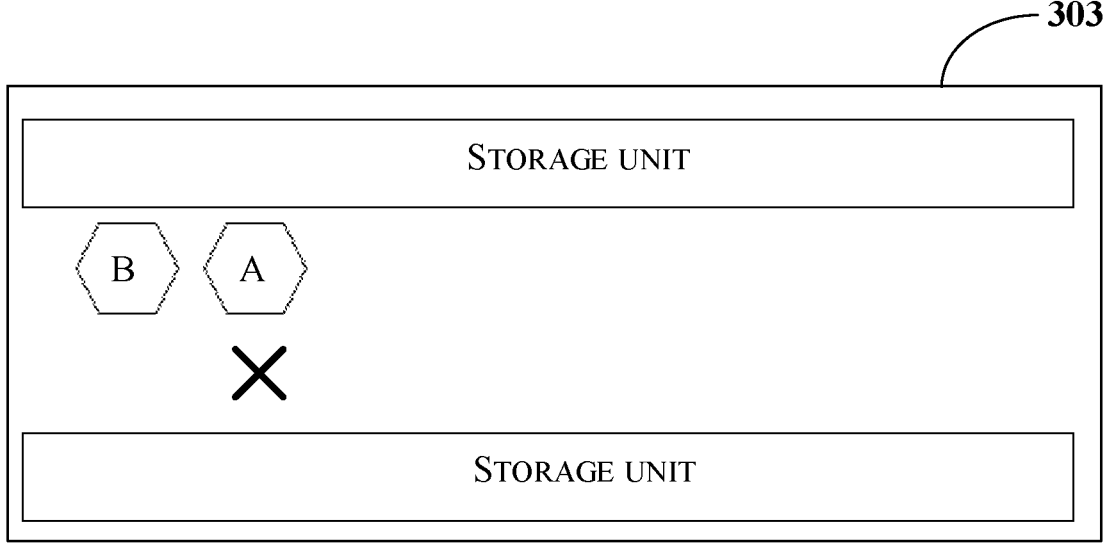

In an embodiment, the pre-defined cost function may comprise utility functions to optimize the positioning of the associated autonomous mobile vehicle and the one or more autonomous mobile vehicles. The pre-defined cost function may comprise, but not limited to, a function indicating the optimal destination position of each of the plurality of autonomous mobile vehicles 101 with respect to storage units in the operating environment, a function indicating a free passage between the storage units, and a minimum disparity between the first destination position of each of the one or more autonomous mobile vehicles and a target position from respective target positions, a minimum disparity between the first destination position of the associated autonomous mobile vehicle with the first target position. FIG. 3A shows an exemplary illustration of the pre-defined cost function. Cross-marks in FIG. 3A indicates that the plurality of autonomous mobile vehicles 101 should not be positioned in front of the item. This ensures that picking of the item by the operator or an autonomous mobile object is not blocked. Further, FIG. 3A illustrates a distance 'd$_2$' between the first destination position of the robot 'A' and corresponding target position. The robot 'A' may be positioned such that there is a minimum disparity between the first destination position and the corresponding target position. FIG. 3C illustrates a free passage between the storage units. The robot 'B' may not be positioned on the cross-mark as it blocks a passage for movement of the operator or an autonomous mobile vehicle. Referring again to FIG. 2, The first destination position determined for the associated autonomous mobile vehicle and each of the one or more autonomous mobile vehicles may be stored as the determination data 208 in the memory 202.

Figure 3D:
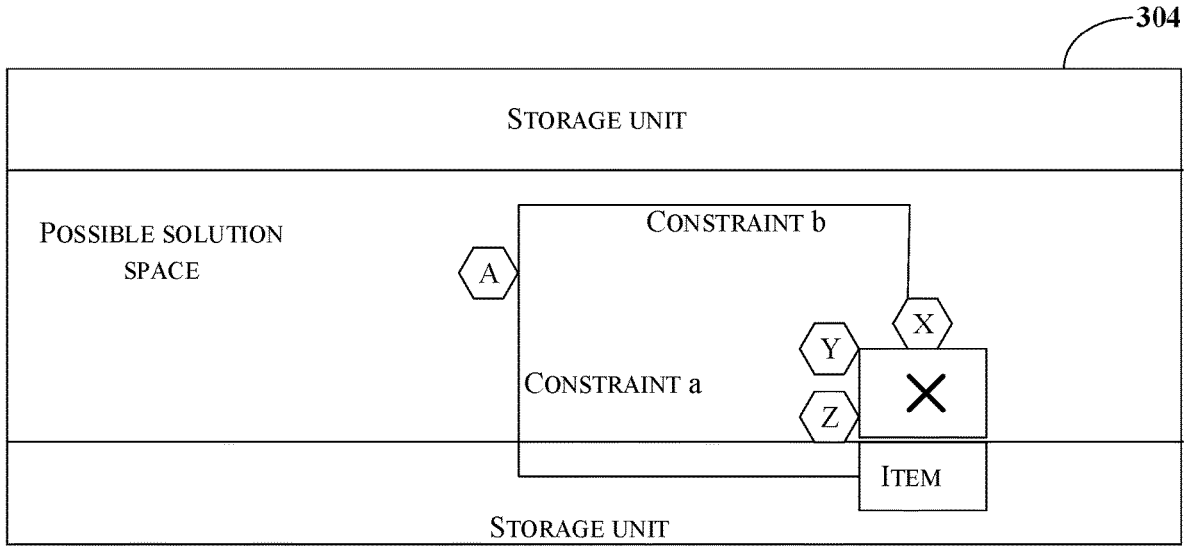

In an embodiment, the second identification module 216 may be configured to receive the determination data 208 and the communication data 206 from the determination module 214 and the communication module 210, respectively. Further, the second identification module 216 may be configured to identify an optimal destination position, for the associated autonomous mobile vehicle and each of the one or more autonomous mobile vehicles, from the corresponding first destination position and the one or more second destination positions, based on the pre-defined cost function. The second identification module 216 may identify the optimal destination position that minimizes the pre-defined cost function. In an embodiment, the second identification module 216 may minimize the pre-defined cost function using gradient descend optimization technique. A person skilled in art will appreciate that any techniques other than the above-mentioned technique may be used to minimize the pre-defined cost function. Referring to the above-stated example, four destination positions (the first and the one or more second destination positions) may be identified for the associated autonomous mobile vehicle and each of the one or more autonomous mobile vehicles. The second identification module 216 may identify one optimal destination position from the four destination positions for the associated autonomous mobile vehicle and each of the one or more autonomous mobile vehicles based on the pre-defined cost function. Referring to an example illustrated in FIG. 3D, consider the pre-defined function for positioning of robot A includes a minimum disparity between the first destination position of each of the one or more autonomous mobile vehicles and a target position from respective target positions and a minimum disparity between the first destination position of the associated autonomous mobile vehicle with the first target position. In such case, the pre-defined function may include a constraint 'a' which is a minimum horizontal distance between a destination position and a target position of the robot A and a constraint 'b' which is a minimum vertical distance between the destination position and the target position of the robot A. Cross-marks in FIG. 3D indicates that the plurality of autonomous mobile vehicles 101 should not be positioned in front of the item. The pre-defined cost function may be represented as f(x, y), where x and y represent position coordinates of the robot A. The pre-defined cost function may be represented as a single function of the constraints 'a' and 'b' as equation (1) provided below:

$$f(x,y) = \text{alpha} * a(x,y) + \text{beta} * b(x,y) \qquad (1)$$

where, alpha+beta=1, alpha>=0, beta>=0.
The destination position of the robot A may be determined by tuning values of alpha and beta. Similarly, computing engines associated with robots X, Y, and Z may determine the destination of the robot A. Finally, a destination position with a minimized value of the pre-defined cost function may be determined as the optimal destination position for the robot A.

In an embodiment, the optimal destination position may not be determined for the first target position of the autonomous mobile vehicle. In such case, the second identification module 216 may be configured to determine an optimal destination position for a next target position from the plurality of target positions of the autonomous mobile vehicle. For example, consider there are six robots at the first target position and the optimal destination position is not determined for robot 1. The second identification module 216 may determine the optimal destination position for the next target position i.e., a second target position from the plurality of target positions. The optimal destination for the first target position may be determined at a later point of time, for instance, after completing tasks at other target positions from the plurality of target positions. In an embodiment, the optimal destination position may not be determined for any of the plurality of target positions of the autonomous mobile vehicle. In such case, the autonomous mobile vehicle may be configured to perform one of, waiting at an idle location and traversing to an alternative path from a plurality of pre-defined alternative paths, when the optimal destination position is not determined for the plurality of target positions, of the autonomous mobile vehicle.

The other data 211 may store data, including temporary data and temporary files, generated by the one or more modules 205 for performing the various functions of the computing engine 102. The other data 211 may be stored in the memory 202. The one or more modules 205 may also include the other modules 217 to perform various miscellaneous functionalities of the computing engine 102. It will be appreciated that the one or more modules 205 may be represented as a single module or a combination of different modules.

FIG. 4 shows an exemplary flow chart illustrating method steps for positioning the autonomous mobile vehicles in the operating environment, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the computing engine 102 transmits a positioning request to other autonomous mobile vehicles from the plurality of autonomous mobile vehicles 101. The autonomous mobile vehicle may be associated with a plurality of target positions. The plurality of target positions may include for example, pick/drop positions of the autonomous mobile vehicle. The computing engine 102 may transmit the positioning request indicating the current position and the first target position from the plurality of target positions to the other autonomous mobile vehicles.

At step 402, the computing engine 102 receives location information from one or more autonomous mobile vehicles in response to the positioning request. The location information may comprise co-ordinates of current location of the one or more autonomous mobile vehicles. The one or more autonomous mobile vehicles may compare corresponding current location with the first target position. Further, the one or more autonomous mobile vehicles in vicinity of the first target position may transmit the location information to the computing engine 102. The computing engine 102 may identify the one or more autonomous mobile vehicles of the plurality of autonomous mobile vehicles 101 in vicinity of the first target position, based on the location information received from the one or more autonomous mobile vehicles.

At step 403, the computing engine 102 determines a first destination position for the associated autonomous mobile vehicle and each of the one or more autonomous mobile vehicles, based on obstacle information of the operating environment, one or more pre-defined constraints, and a pre-defined cost function. The obstacle information may include information of the obstacles in the operating environment. The obstacles may include storage units, operators, reception units, and the like. In an embodiment, the one or more pre-defined constraints may comprise, but not limited to, a minimum distance of the associated mobile object and the one or more autonomous mobile vehicles with each other, an orientation of the associated autonomous mobile vehicle and the one or more autonomous mobile vehicles with respect to each other and storage units in the operating environment, and the determination of the first destination position of the associated autonomous mobile vehicle and each of the one or more autonomous mobile vehicles prior to notifying the first target position and a target position from respective target positions to operators in the operating environment, respectively. In an embodiment, the pre-defined cost function may comprise utility functions to optimize the positioning of the associated autonomous mobile vehicle and the one or more autonomous mobile vehicles. The pre-defined cost function may comprise, but not limited to, a function indicating the optimal destination position of each of the plurality of autonomous mobile vehicles 101 with respect to storage units in the operating environment, a function indicating a free passage between the storage units, and a minimum disparity between the first destination position of each of the one or more autonomous mobile vehicles and a target position from respective target positions, a minimum disparity between the first destination position of the associated autonomous mobile vehicle with the first target position.

At step 404, the computing engine 102 receives the one or more second destination positions for the associated autonomous mobile vehicle and for each of the one or more autonomous mobile vehicles, from the one or more autonomous mobile vehicles. The computing engines associated with the one or more autonomous mobile vehicles may determine the one or more second destination positions for the associated autonomous mobile vehicle and for each of the one or more autonomous mobile vehicles, based on the obstacle information, the one or more pre-defined constraints, and the pre-defined cost function. The one or more pre-defined constraints may comprise, but not limited to, a minimum distance of the associated mobile object and the one or more autonomous mobile vehicles with each other, an orientation of the associated autonomous mobile vehicle and the one or more autonomous mobile vehicles with respect to each other and storage units in the operating environment, and the determination of the one or more second destination positions of the associated autonomous mobile vehicle and each of the one or more autonomous mobile vehicles prior to notifying the first target position and a target position from respective target positions to operators in the operating environment, respectively. The pre-defined cost function may comprise, but not limited to, a function indicating the optimal destination position of each of the plurality of autonomous mobile vehicles 101 with respect to storage units in the operating environment, a function indicating a free passage between the storage units, a minimum disparity between the one or more second destination positions of each of the one or more autonomous mobile vehicles and the target position from respective target positions, a minimum disparity between the one or more second destination positions of the associated autonomous mobile vehicle with the first target position.

At step 405, the computing engine 102 identifies an optimal destination position, for the associated autonomous mobile vehicle and each of the one or more autonomous mobile vehicles, from the corresponding first destination position and the one or more second destination positions, based on the pre-defined cost function. The computing engine 102 identifies the optimal destination position that minimizes the pre-defined cost function. In an embodiment, the computing engine 102 determines an optimal destination position for a next target position from the plurality of target positions of the autonomous mobile vehicle, when the optimal destination position is not determined for the first target position of the autonomous mobile vehicle. In an embodiment, the autonomous mobile vehicle may be configured to perform one of, waiting at an idle location and traversing to an alternative path from a plurality of pre-defined alternative paths, when the optimal destination position is not determined for the plurality of target positions, of the autonomous mobile vehicle.

Computer System

Figure 5:
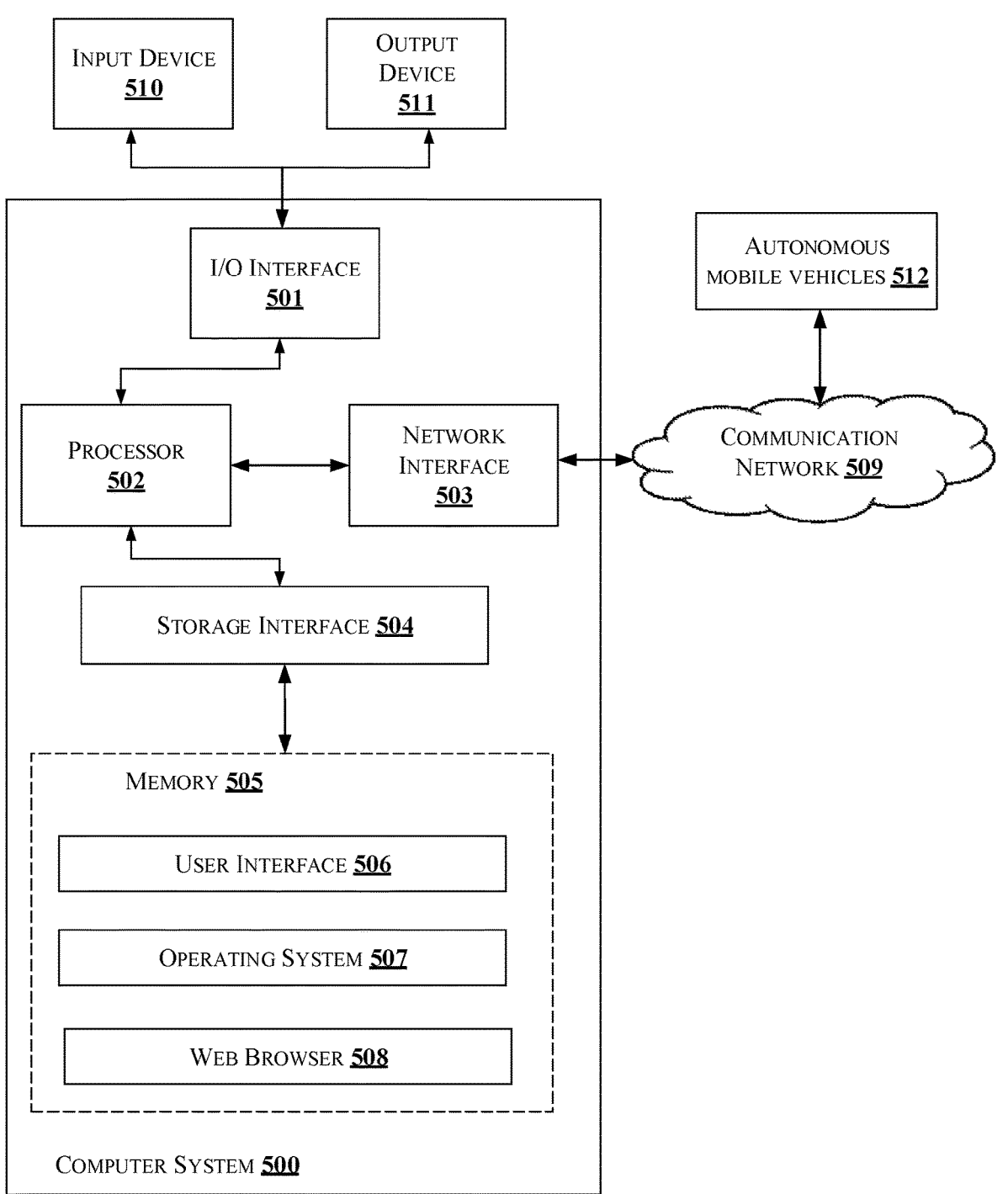
FIG. 5 shows a block diagram of a general-purpose computing system for positioning the autonomous mobile vehicles in the operating environment, in accordance with embodiments of the present disclosure.

FIG. 5 illustrates a block diagram of an exemplary computer system 500 for implementing embodiments consistent with the present disclosure. In an embodiment, the computer system 500 may be the computing engine 102. Thus, the computer system 500 may be used to positioning autonomous mobile vehicles in an operating environment. The computer system 500 may transmit the positioning request to other autonomous mobile vehicles from the plurality of autonomous mobile vehicles 101 over a communication network 509. Further, the computer system 500 may receive the one or more second destination positions from the one or more autonomous mobile vehicles over the communication network 509. The other autonomous mobile vehicles and the one or more autonomous mobile vehicles are represented as autonomous mobile vehicles 512 in FIG. 5. The computer system 500 may comprise a Central Processing Unit 502 (also referred as "CPU" or "processor"). The processor 502 may comprise at least one data processor. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACK-BERRY® OS, or the like.

In some embodiments, the computer system 500 may implement the web browser 508 stored program component. The web browser 508 may be a hypertext viewing application, for example MICROSOFT® INTERNET EXPLORER™, GOOGLER CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

The present disclosure provides a method of positioning autonomous mobile vehicles in an operating environment. In the present disclosure, all the autonomous mobile vehicles communicate with each other and determine destination positions for the autonomous mobile vehicles considering obstacle information of the operating environment, pre-defined constraints, and a pre-defined cost function. This ensures that there is no congestion avoids collision of the autonomous mobile vehicles with each other and obstacles. The autonomous mobile vehicles identify an optimal destination position from multiple destination positions, based on the pre-defined cost function. Hence, the present disclosure ensures optimal positioning of the autonomous mobile vehicles in the operating environment.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method of positioning autonomous mobile vehicles in an operating environment having a plurality of storage units, the method comprising:

transmitting, by a computing engine of an autonomous mobile vehicle from a plurality of autonomous mobile vehicles, a positioning request indicating a current position and a first target position from a plurality of target positions of the autonomous mobile vehicle, to other autonomous mobile vehicles from the plurality of autonomous mobile vehicles, wherein the plurality of target positions include pick positions and/or drop positions at the plurality of storage units;

identifying, by the computing engine, one or more autonomous mobile vehicles of the plurality of autonomous mobile vehicles in vicinity of the first target position, based on location information received from the one or more autonomous mobile vehicles in response to the positioning request;

determining, by the computing engine, a first destination position for the associated autonomous mobile vehicle and each of the one or more autonomous mobile vehicles, based on obstacle information of the operating environment, one or more pre-defined constraints, and a pre-defined cost function;

receiving, by the computing engine, one or more second destination positions for the associated autonomous mobile vehicle and for each of the one or more autonomous mobile vehicles, from the one or more autonomous mobile vehicles; and identifying, by the computing engine, an optimal destination position, for the associated autonomous mobile vehicle and each of the one or more autonomous mobile vehicles, from the corresponding first destination position and the one or more second destination positions, based on the pre-defined cost function.

2. The method of claim 1, wherein the one or more pre-defined constraints comprise at least one of, a minimum distance between each of the one or more autonomous mobile vehicles, an orientation of the one or more autonomous mobile vehicles with respect to each other and the plurality of storage units in the operating environment, and the determination of the first destination position and the one or more second destination positions of the associated autonomous mobile vehicle and each of the one or more autonomous mobile vehicles prior to notifying the first target position and a target position from respective target positions to operators in the operating environment, respectively.

3. The method of claim 1, wherein the pre-defined cost function comprises at least one of, a function indicating the optimal destination position of each of the plurality of autonomous mobile vehicles with respect to the plurality of storage units in the operating environment, a function indicating a free passage between the plurality of storage units, and a minimum disparity between the first destination position of each of the one or more autonomous mobile vehicles and a target position from respective target positions, a minimum disparity between the one or more second destination positions of each of the one or more autonomous mobile vehicles and the target position from respective target positions, a minimum disparity between the first destination position and the one or more second destination positions of the associated autonomous mobile vehicle with the first target position.

4. The method of in claim 1, further comprising:

determining an optimal destination position for a next target position from the plurality of target positions of the autonomous mobile vehicle, when the optimal destination position is not determined for the first target position of the autonomous mobile vehicle.

5. The method of in claim 1, further comprising:

performing one of, waiting at an idle location and traversing to an alternative path from a plurality of pre-defined alternative paths, when the optimal destination position is not determined for the plurality of target positions, of the autonomous mobile vehicle.

6. The method of in claim 1, wherein the one or more autonomous mobile vehicles determine the one or more second destination positions based on the obstacle information, the one or more pre-defined constraints, and the pre-defined cost function.

7. A computing engine for positioning autonomous mobile vehicles in an operating environment having a plurality of storage units, wherein the computing engine is associated with an autonomous mobile vehicle of a plurality of autonomous mobile vehicles, the computing engine comprises:

a memory for storing processor-executable instructions; and one or more processors configured to:

transmit a positioning request indicating a current position and a first target position from a plurality of target positions of the autonomous mobile vehicle, to other autonomous mobile vehicles from the plurality of autonomous mobile vehicles, wherein the plurality of target positions include pick positions and/or drop positions at the plurality of storage units;

identify one or more autonomous mobile vehicles of the plurality of autonomous mobile vehicles located in vicinity of the first target position, based on location information received from the one or more autonomous mobile vehicles in response to the positioning request;

determine a first destination position for the associated autonomous mobile vehicles and each of the one or more autonomous mobile vehicles, based on obstacle information of the operating environment, one or more pre-defined constraints, and a pre-defined cost function;

receive one or more second destination positions for the associated autonomous mobile vehicle and for each of the one or more autonomous mobile vehicles, from the one or more autonomous mobile vehicles; and

identify an optimal destination position, for the associated autonomous mobile vehicle and each of the one or more autonomous mobile vehicles, from the corresponding first destination position and the one or more second destination positions, based on the pre-defined cost function.

8. The computing engine of claim 7, wherein the one or more pre-defined constraints comprise at least one of, a minimum distance of the associated mobile object and the one or more autonomous mobile vehicles with each other, an orientation of the associated autonomous mobile vehicle and the one or more autonomous mobile vehicles with respect to each other and the plurality of storage units in the operating environment, and the determination of the first destination position and the one or more second destination positions of the associated autonomous mobile vehicle and each of the one or more autonomous mobile vehicles prior to notifying the first target position and a target position from respective target positions to operators in the operating environment, respectively.

9. The computing engine of claim 7, wherein the pre-defined cost function comprises at least one of, a function indicating the optimal destination position of each of the plurality of autonomous mobile vehicles with respect to the plurality of storage units in the operating environment, a function indicating a free passage between the plurality of storage units, and a minimum disparity between the first destination position of each of the one or more autonomous mobile vehicles and a target position from respective target positions, a minimum disparity between the one or more second destination positions of each of the one or more autonomous mobile vehicles and the target position from respective target positions, a minimum disparity between the first destination position and the one or more second destination positions of the associated autonomous mobile vehicle with the first target position.

10. The computing engine of claim 7, wherein the one or more processors are further configured to:

determine an optimal destination position for a next target position from the plurality of target positions of the autonomous mobile vehicle, when the optimal destination position is not determined for the first target position of the autonomous mobile vehicle.

11. The computing engine of claim 7, wherein the one or more processors are further configured to:

performing one of, instructing the autonomous mobile vehicle to wait at an idle location and traverse to an alternative path from a plurality of pre-defined alternative paths, when the optimal destination position is not determined for the plurality of target positions, of the autonomous mobile vehicle.

12. The computing engine of claim 7, wherein the one or more autonomous mobile vehicles determine the one or more second destination positions based on the obstacle information, the one or more pre-defined constraints, and the pre-defined cost function.

13. A non-transitory computer readable medium including instructions stored thereon that when processed by one or more processors, wherein the instructions cause a computing engine to:

transmit a positioning request indicating a current position and a first target position from a plurality of target positions of the autonomous mobile vehicle, to other autonomous mobile vehicles from the plurality of autonomous mobile vehicles, wherein the plurality of target positions include pick positions and/or drop positions at a plurality of storage units in an operating environment;

identify one or more autonomous mobile vehicles of the plurality of autonomous mobile vehicles in vicinity of the first target position, based on location information received from the one or more autonomous mobile vehicles in response to the positioning request;

determine a first destination position for the associated autonomous mobile vehicle and each of the one or more autonomous mobile vehicles, based on obstacle information of the operating environment, one or more pre-defined constraints, and a pre-defined cost function;

receive one or more second destination positions for the associated autonomous mobile vehicle and for each of the one or more autonomous mobile vehicles, from the one or more autonomous mobile vehicles; and identify an optimal destination position, for the associated autonomous mobile vehicle and each of the one or more autonomous mobile vehicles, from the corresponding first destination position and the one or more second destination positions, based on the pre-defined cost function.

14. The medium of claim 13, wherein the one or more pre-defined constraints comprise at least one of, a minimum distance of the associated mobile object and the one or more autonomous mobile vehicles with each other, an orientation of the associated autonomous mobile vehicle and the one or more autonomous mobile vehicles with respect to each other and the plurality of storage units in the operating environment; and the determination of the first destination position and the one or more second destination positions of the associated autonomous mobile vehicle and each of the one or more autonomous mobile vehicles prior to notifying the first target position and a target position from respective target positions to operators in the operating environment, respectively.

15. The medium of claim 13, wherein the pre-defined cost function comprises at least one of, a function indicating the optimal destination position of each of the plurality of autonomous mobile vehicles with respect to the plurality of storage units in the operating environment, a function indicating a free passage between the plurality of storage units, and a minimum disparity between the first destination position of each of the one or more autonomous mobile vehicles and a target position from respective target positions, a minimum disparity between the one or more second destination positions of each of the one or more autonomous mobile vehicles and the target position from respective target positions, a minimum disparity between the first destination position and the one or more second destination positions of the associated autonomous mobile vehicle with the first target position.

16. The medium of claim 13, wherein the instructions further cause the one or more processors to:

determine an optimal destination position for a next target position from the plurality of target positions of the autonomous mobile vehicle, when the optimal destination position is not determined for the first target position of the autonomous mobile vehicle.

17. The medium of claim 13, wherein the instructions further cause the one or more processors to:

perform one of, waiting at an idle location and traversing to an alternative path from a plurality of pre-defined alternative paths, when the optimal destination position is not determined for the plurality of target positions, of the autonomous mobile vehicle.

18. The medium of claim 13, wherein the one or more autonomous mobile vehicles determine the one or more second destination positions based on the obstacle information, the one or more pre-defined constraints, and the pre-defined cost function.

19. The method of claim 1, wherein identifying the optimal destination position for the associated autonomous mobile vehicle and each of the one or more autonomous mobile vehicles comprises minimizing the pre-defined cost function.

20. The computing engine of claim 7, wherein the one or more processors are configured to identify the optimal destination position for the associated autonomous mobile vehicle and each of the one or more autonomous mobile vehicles by minimizing the pre-defined cost function.

* * * * *